May 27, 1958 E. H. GATZERT 2,836,660

INTEROFFICE TRUNKING IN TELEPHONE SYSTEMS

Filed July 29, 1955 5 Sheets-Sheet 1

INVENTOR.
ERNEST H. GATZERT
BY F. H. Henson
AGENT

May 27, 1958 E. H. GATZERT 2,836,660

INTEROFFICE TRUNKING IN TELEPHONE SYSTEMS

Filed July 29, 1955 5 Sheets-Sheet 3

May 27, 1958 E. H. GATZERT 2,836,660

INTEROFFICE TRUNKING IN TELEPHONE SYSTEMS

Filed July 29, 1955 5 Sheets-Sheet 4

INTEROFFICE TRUNKING IN TELEPHONE SYSTEMS

Filed July 29, 1955 5 Sheets-Sheet 5

United States Patent Office 2,836,660 Patented May 27, 1958

2,836,660

INTEROFFICE TRUNKING IN TELEPHONE SYSTEMS

Ernest H. Gatzert, Rochester, N. Y., assignor to General Dynamics Corporation, a corporation of Delaware Application July 29, 1955, Serial No. 525,202

6 Claims. (Cl. 179—18)

Figure 1:
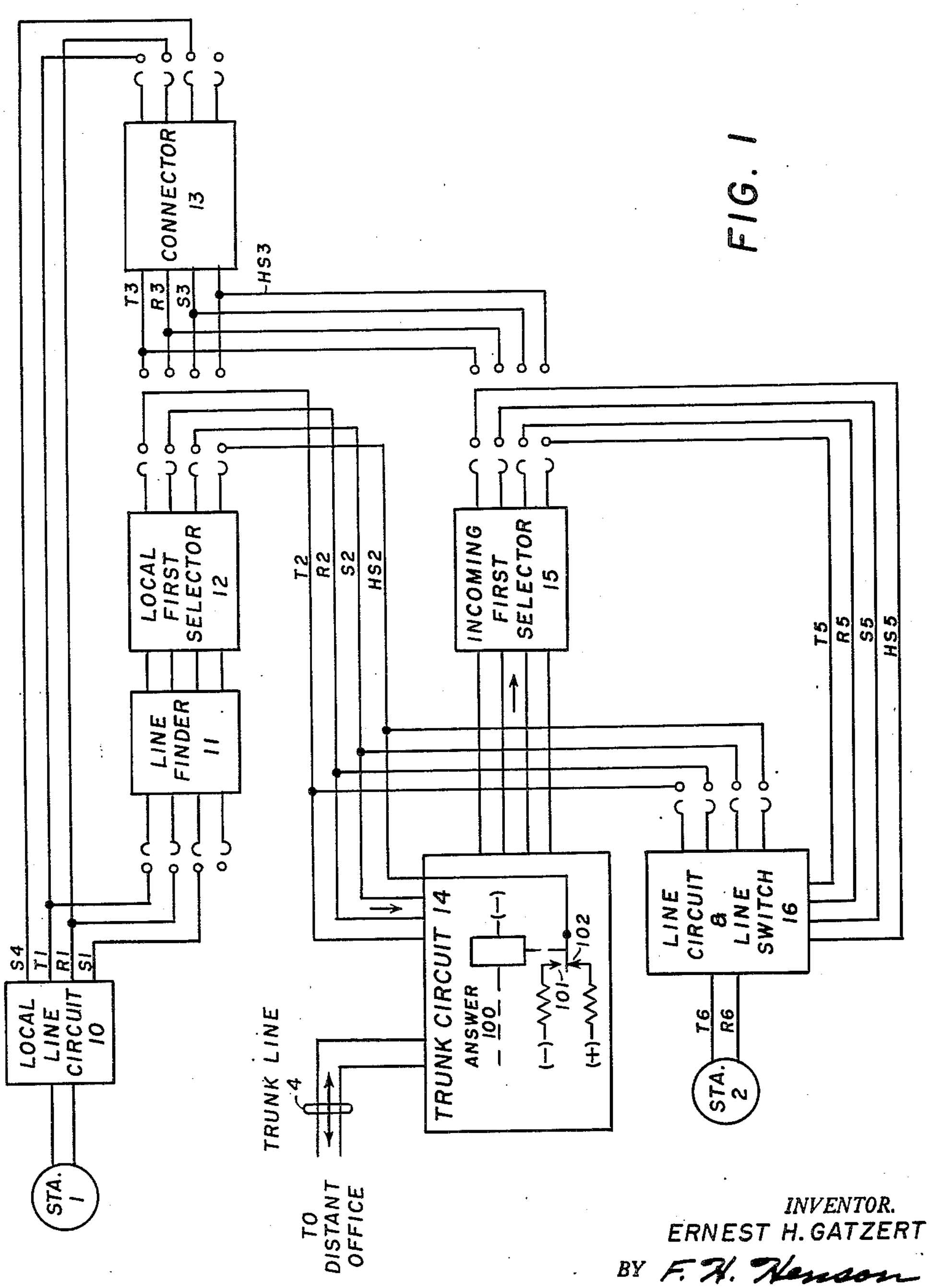
Figure 2:
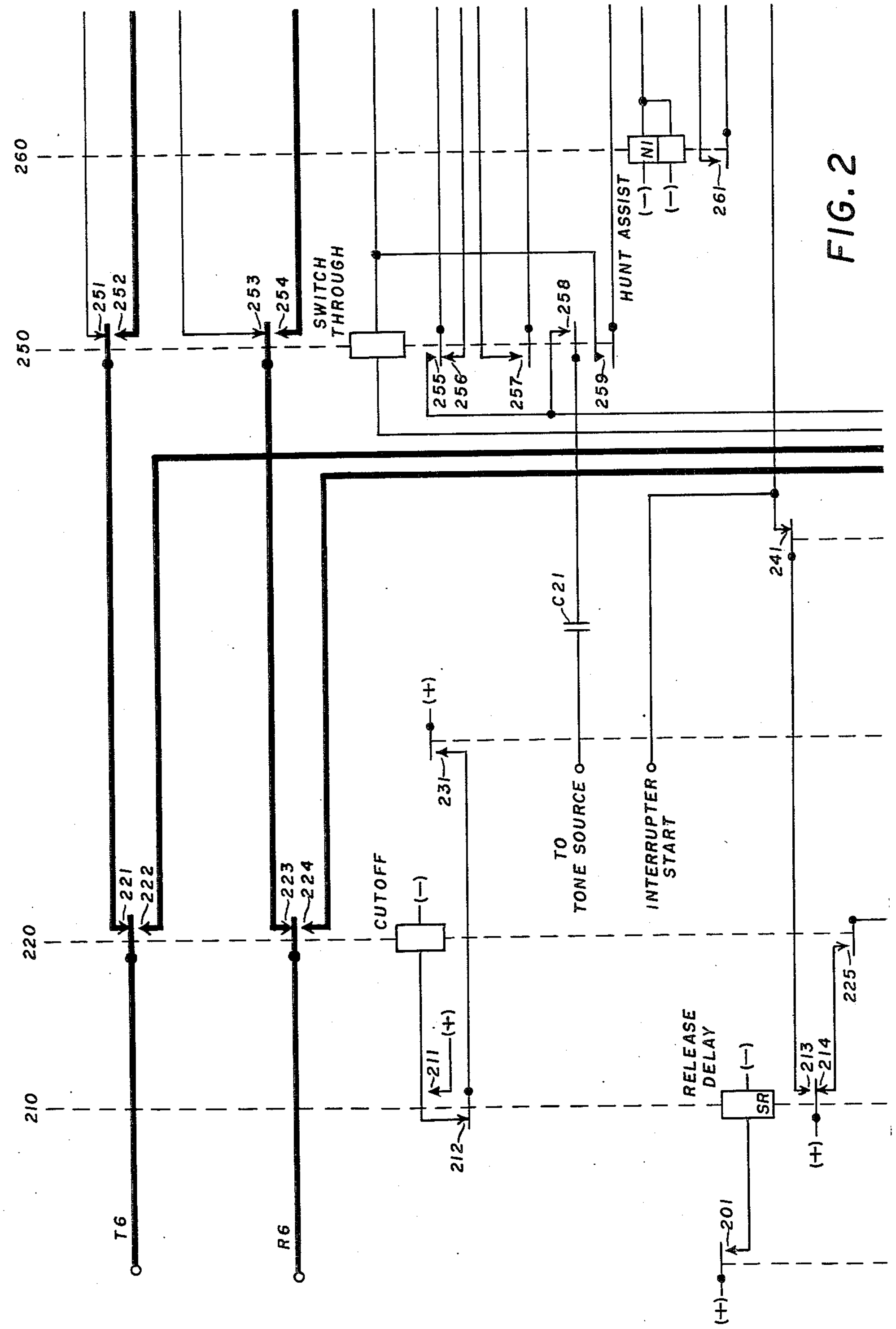
Figure 3:
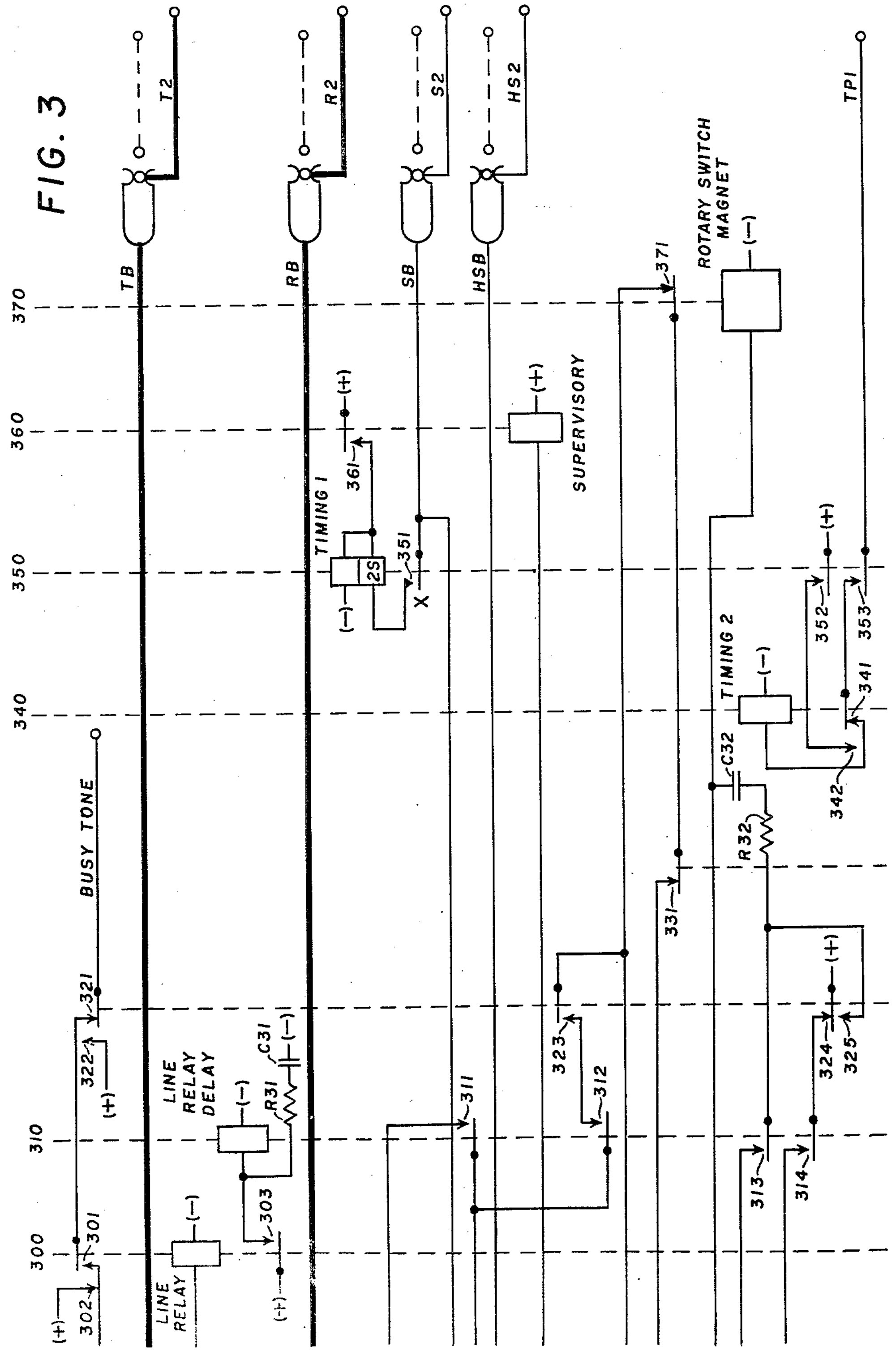
Figure 4:
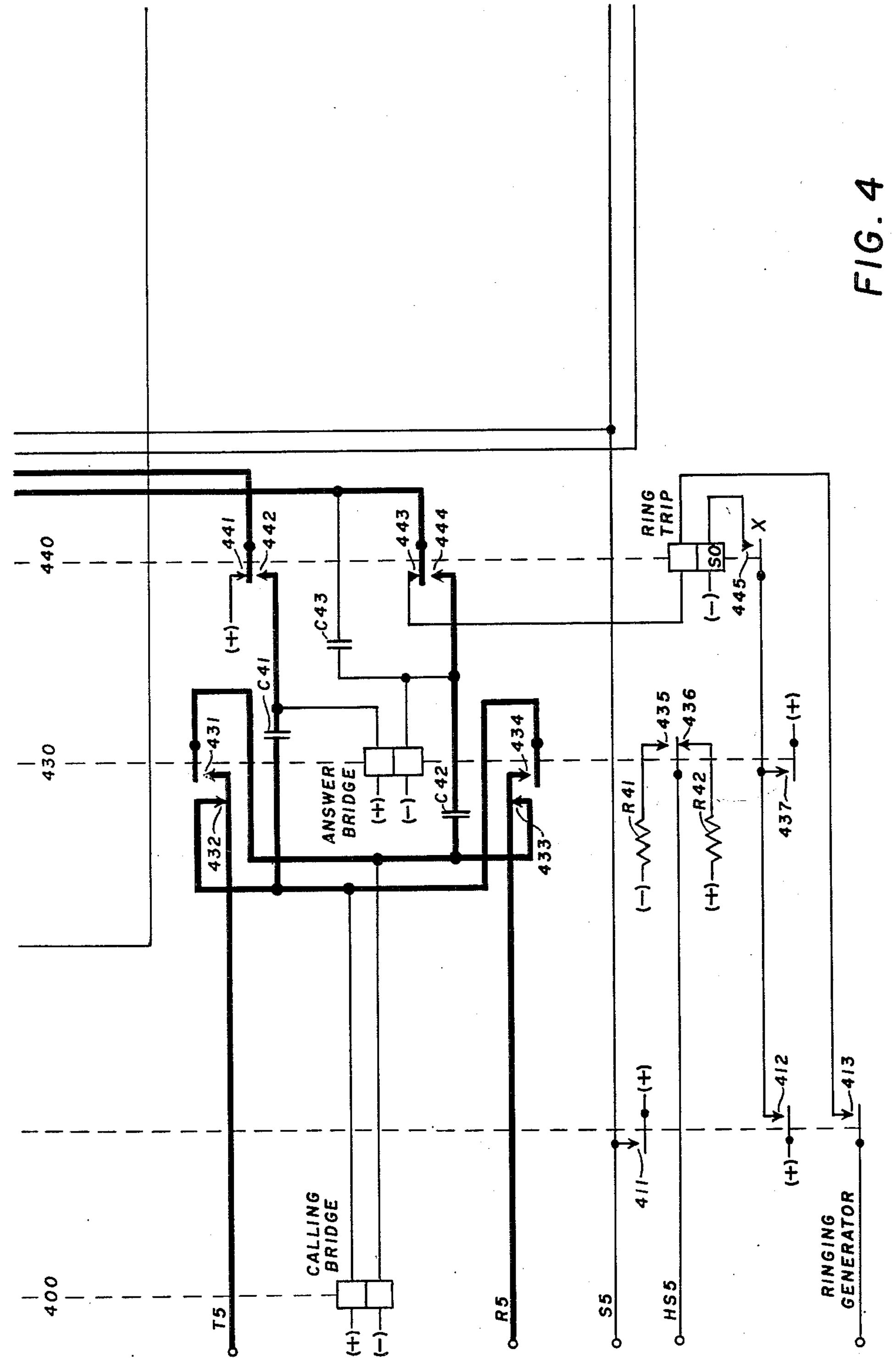

This invention relates in general to telephone systems, and more particularly to interoffice trunking in telephone systems.

In a large telephone network, subscriber lines requiring special services of one type or another are often included. One such line is of the type which is given direct access to an operator's position or communication center. That is, the mere act of lifting the handset serves to connect the line to the communication center.

It may happen that the station to be given such service is remotely located from the communication center but is in close proximity to another telephone exchange. For economical reasons it is desirable to utilize existing trunks between the telephone exchange and the communication center to route calls from the special line to the distant operator. However, if an existing trunk is assigned to the special service line, the traffic on the remaining trunks is, of course, increased and the quality of service is curtailed.

Accordingly, it is the general object of this invention to provide a new and improved telephone system.

It is a more particular object of this invention to provide a new and improved telephone system in which calls originating on a certain type of subscriber line are routed over trunk lines provided for regular service between a local office and a distant office in such a manner that the quality of service for regular calls is not markedly curtailed.

The invention accomplishes the above cited objects by providing a special line circuit and line switch in the local office to which the special line is connected. The line switch has access to all of the two-way trunks between the local office and the distant office, which trunks are also used to carry the regular calls between the two offices. Lifting the handset at the station on the line causes the line switch to seize an idle trunk circuit and thus route the call to the distant office. Thus the special line shares the trunk lines with the regular lines rather than having exclusive use of one of the trunk lines.

A feature of the invention is the provision of timing means in the line circuit which operates to release the seized trunk circuit only after the operator in the distant office has answered and disconnected. Timing is provided so that a "permanent" appearing on the special line will not withhold one of the interoffice trunks from use. The on-hook, off-hook supervisory signals transmitted by the trunk circuit are used to initiate the timing cycle of the timing means over a second control conductor which is extended through the line switch from the line circuit to the trunk circuit. The timing feature is not provided in the interoffice trunk circuits since local lines have access to the trunk circuit through local first selector banks, and "permanents" appearing on the regular lines serve only to hold the local first selector. Thus, permanent timing for the local lines is provided in the local first selectors in the well known manner.

Further objects and advantages of the invention will become apparent as the following description proceeds, and the features of novelty which characterize the invention will be pointed out with particularity in the claims annexed to and forming a part of this specification.

For a better understanding of this invention, reference may be had to the accompanying drawings which comprise six figures on five sheets.

Fig. 1 shows the trunking diagram of the described system; and

Figures 5, 6:
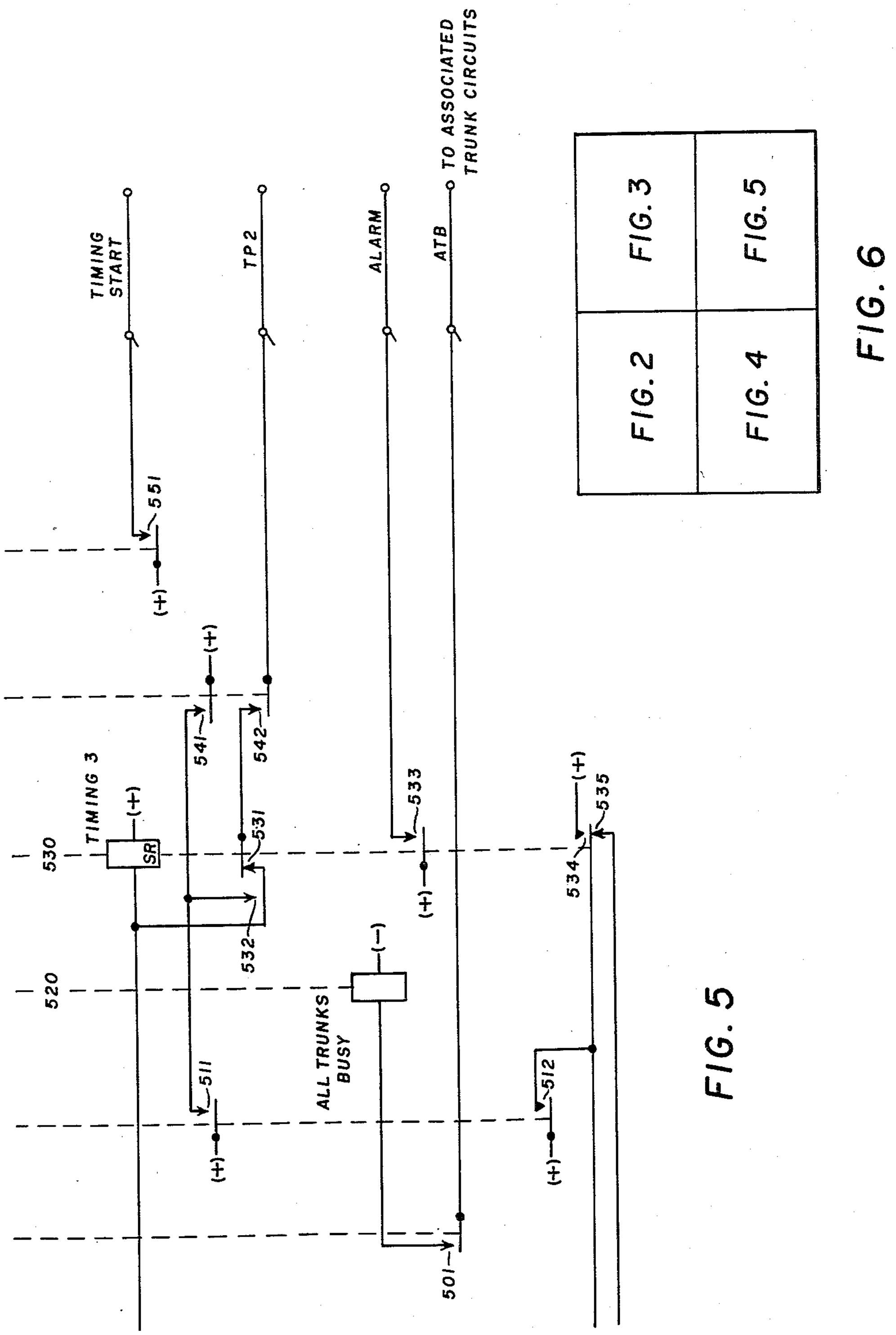

Figs. 2, 3, 4 and 5, when arranged in the manner shown in Fig. 6, show circuit details of a line circuit and line switch in which a special line terminates in the local office.

The general operation of the system can best be understood by reference to the trunking diagram of Fig. 1. As shown, the system comprises local office equipment and a trunk line 4 extending to a distant office. Local subscriber stations, such as STA1, can extend talking connections to other local subscriber stations through the associated line circuit, such as local line circuit 10, line finder 11, selector 12, and from certain levels of the selector banks to the local connectors, such as connector 13. Conductors T1, R1 and S4, which terminate in the connector banks, are shown connected to line circuit 10 for use when local line 10 is called. It is to be understood, of course, that all of the local lines terminate in the connector banks in like manner. The local stations also have access, through the banks of selector 12 and over conductors T2, R2, S2 and HS2, to trunk circuit 14 and thus trunk line 4 to the distant office. Only one trunk circuit 14 has been shown but it is to be understood that a number of trunk circuits identical to trunk circuit 14 terminate in a given level or levels of the local first selector 12.

Special lines, such as the line comprising conductors T6 and R6 and terminated by subscriber station STA2, are prevented from extending talking connections to other lines terminating in the local office. The special lines terminate in a line circuit and line switch, such as 16. Line switch 16 has access to trunk circuit 14 by way of conductors T2, R2, S2 and HS2 which, as previously mentioned, are multiplied to the banks of the local first selector 12.

Calls incoming over trunk line 4 from the distant office are routed through trunk circuit 14 and incoming first selector 15. Selector 15 has access to the local connectors, such as 13, and thus the local lines, and also has access to the special line circuit 16 over conductors T5, R5, S5 and HS5. When seized over these conductors, line circuit 16 functions to connect ringing voltage to the line conductors T6 and R6 for the purpose of signaling station STA2. When the call is answered, ringing is tripped in line circuit 16 and a talking connection is established between the distant office and station STA2.

A detailed description of the system follows.

*Call from station STA2 to the distant office*

Referring to Figs. 2–5, when the subscriber at the special station lifts his handset, a loop is closed across conductors T6 and R6. Line relay 300 operates over a circuit extending from ground on the break portion 302 of its make before break contacts, through break contacts 251 on unoperated relay 250, break contacts 221 on unoperated relay 220, over conductor T6, through the loop closed at the station, over conductor R6, through break contacts 223 on unoperated relay 220, break contacts 253 on relay 250, and through the winding of the relay to battery. At its operated make contacts 501, relay 300 closes an operating circuit for the all trunks busy relay 520. Conductor ATB, which extends to all of the trunk circuits to which the line switch has access, is connected to ground as long as any one of the trunk circuits is idle. Thus, if all of the trunk circuits are busy, relay 520 does not operate and busy tone is connected to the special station from the busy tone conductor through break contacts 321 on unoperated all trunks busy relay 520 and through operated make contacts 301 on line relay 300. However, if one or more trunk circuits are idle, relay 520 operates and at its operated contacts 322 connects ground to the previously described tip circuit and busy tone is disconnected at break contacts 321.

Line relay delay relay 310 operates in an obvious circuit through operated make contacts 303. At its operated make contacts 512, relay 310 connects ground to sleeve conductor S5 to mark the line circuit as busy in the incoming first selector banks. If the sleeve terminal on which sleeve brush SB is standing is connected to ground, signifying that the associated trunk circuit is busy, relay 260 operates over a circuit extending from the sleeve brush through break contacts 256, operated make contacts 312, operated make contacts 323 on relay 520, interrupter contacts 371 on the rotary switch magnet 370, break contacts 331 on unoperated relay 530, and through the operating winding and non-inductive winding of relay 260 to battery. Rotary switch magnet 370 is now operated over a circuit extending from ground on operated make contacts 325 of relay 520, through operated make contacts 313, operated make contacts 261, and through the winding of the magnet to battery. The rotary switch is of the spring driven type and thus does not step until magnet 370 is deenergized. When the magnet 370 is energized, interrupter contacts 371 open to release the hunt assist relay 260. At contacts 261, relay 260 opens the energizing path for magnet 370 and thus the switch is stepped ahead to the next set of terminals. The circuit will continue to function in this manner until sleeve brush SB contacts an idle sleeve terminal, such as S2 extending to trunk circuit 14. The spark protection circuit, comprising capacitor C32 and resistor R32, serves to protect the pulsing contacts 261 on relay 260 during the advancement of the rotary switch.

Switchthrough relay 250 is shunted with ground on both sides of its winding during the hunting operation. Ground on operated contacts 512 of relay 310 and through break contacts 535 on unoperated relay 530 is connected to one terminal of the winding of relay 250. Ground on the sleeve brush SB is connected to the other terminal of relay 250 through break contacts 256 and through operated make contacts 311. When an idle trunk circuit is found, the latter mentioned terminal is connected to battery through the windings of relay 260 over the previously described operating circuit for relay 260. The resistance of the winding of the switchthrough relay 250 is sufficiently high to prevent the series operation of the hunt assist relay 260 in this circuit.

When switchthrough relay 250 operates, the tip and ring conductors T6 and R6, respectively, are connected through operated make contacts 252 and 254 on relay 250 to the tip and ring brushes TB and RB, respectively, of the rotary switch. Thus the loop completed at STA2 is utilized to seize the calling bridge relay of trunk circuit 14 in the well known manner. The operating circuit for line relay 300 is opened at break contacts 251 and 253 on relay 250. Thus, relay 300 releases. Relay 520 releases because of the opening of contacts 501 on relay 300. The energizing circuit for line relay delay relay 310 is also opened by contacts 303, but this relay is made slow release by virtue of the resistor-capacitor network comprising resistor R31 and capacitor C31 in parallel with its winding. Relay 310 is made slow release so that it will maintain ground through its contacts 512 on the sleeve conductor S5 until the calling bridge and release delay relays in trunk circuit 14 are operated to return ground over sleeve conductor S2 and brush SB. Ground appearing on brush SB is connected through operated contacts 255 on relay 250 to the sleeve conductor S5.

It will be noted that answer relay 100 in trunk circuit 14, which is shown in Fig. 1, returns an on-hook supervisory signal of resistance ground through its break contacts 102, over the hunt sleeve conductor HS2 and through brush HSB on the rotary switch until the call is answered. When the call is answered in the distant office, answer relay 100 in trunk circuit 14 operates in any well known manner and at its operated make contacts 101 connects an off-hook supervisory signal of resistance battery to the conductor HS2. This off-hook supervisory signal is connected through operated make contacts 257 on relay 250 to the ground connected winding of supervisory relay 360.

Timing 1 relay 350, which is a two step relay, is now operated to its first step by ground connected through operated make contacts 361. It can be seen that the upper winding of relay 350 is energized but that the operation of the preliminary make contact 351 serves to shunt the lower winding of relay 350 with ground on operated make contacts 361 and ground appearing on sleeve brush SB. Relay 350 is designed so as to operate only to its first step when the upper winding is energized and the lower winding is shunted.

In normal operation, the calling subscriber at station STA2 will hang up to terminate and release the call before the operator in the distant office disconnects. When the calling party hangs up, the loop circuit to the calling bridge relay in trunk circuit 14 will be opened to initiate the release of the connection. When the release delay relay in the trunk circuit releases, ground is removed from conductor S2 and switchthrough relay 250 releases to release relays 360 and 350. The circuits are thus restored to normal.

If a permanent signal appears across line conductors T6 and R6 or if a subscriber at station STA2 fails to hang up after the operator disconnects, the call will be timed out. It will be remembered that when the operator answers, timing 1 relay 350 operates to its first step. When the operator disconnects, answer relay 100 in trunk circuit 14 releases to return resistance ground over conductor HS2 and brush HSB. Supervisory relay 360 releases and at contacts 361 removes the shunt for the lower winding of timing 1 relay 350. Relay 350 now operates fully from ground on sleeve brush SB through its preliminary make contacts 351 and through its two windings in series to battery. At its operated make contacts 551, relay 350 closes ground to the timing start conductor to start the interrupter if it is not already in operation.

The operation of the interrupter serves to connect a ground pulse to conductor TP1 every two minutes. The first ground pulse appearing on conductor TP1 after the operation of relay 350 serves to operate timing 2 relay 340 through operated make contacts 353 and through break contacts 341. Relay 340 locks operated through its make contacts 342 and through make contacts 352 to ground. A ground pulse appearing on conductor TP2 approximately two minutes after the appearance of a ground pulse on conductor TP1 operates timing 3 relay 530 through operated make contacts 542 on relay 340 and through its break contacts 531.

Relay 530 locks operated through its make contacts 532 and through operated make contacts 541 on relay 340 to ground. At its operated make contacts 533, relay 530 connects ground to the alarm conductor.

Switchthrough relay 250 is released when relay 530 operates since its energizing circuit from ground on brush SB is opened at break contacts 535 on relay 530. When relay 250 releases, the loop circuit is disconnected from the tip and ring brushes TB and RB so that the calling bridge relay in trunk circuit 14 is released to initiate the release of the connection. The loop across conductors T6 and R6 then serves to operate line relay 300 which, in turn, operates relays 520 and 310, as previously described. The circuit is now in the lockout condition. Hunt assist relay 260 cannot be operated since its energizing circuit is opened at break contacts 331 on operated relay 530. Switchthrough relay 250 cannot be operated since its operating circuit is opened at break contacts 535 and break contacts 331 on relay 530.

A class of line tone is applied through capacitor C21 and operated make contacts 258 and 255 on relay 250 to the sleeve brush SB to inform the operator of the class of the calling line. This tone is applied to the trunk line by trunk circuit 14 for a short interval of time when the operator answers in the well known manner. It may happen that the operator will disconnect momentarily so as to recheck the tone signal. It is, of course, necessary to reset the timing means under these circumstances. It will be remembered that timing 1 relay 350 operated completely when the operator disconnected. If the operator should reconnect before the timing cycle is completed, resistance battery appearing on conductor HSB operates supervisory relay 360 as before. At contacts 361, relay 360 closes a shunting path for the lower winding of timing 1 relay 350 and this relay releases to its first step. The timing means is reset regardless of its condition. For example, the operating circuit from conductor TP1 to relay 340 is open at make contacts 353 on relay 350 and the holding circuit for relay 340 is opened at contacts 352 on relay 350. With relay 340 released, the ground pulse on conductor TP2 cannot operate timing 3 relay 530 to release the connection.

*Call from distant office to station STA2*

A call incoming from the distant office over trunk line 4 seizes trunk circuit 14 and incoming first selector 15 in the well known manner. Selector 15 is then directively controlled to establish connection with conductors T5, R5, S5 and HS5 if line circuit 16 is marked as idle by the absence of ground on conductor S5. Trunk circuit 14 closes a loop across tip and ring conductors T5 and R5 to operate calling bridge relay 400 through break contacts 432 and 433 on answer bridge relay 430. At its operated contacts 201, relay 400 closes an operating circuit for release delay relay 210. At its operated contacts 411, relay 210 closes ground to sleeve conductor S5 to hold the incoming first selector 15 operated in the well known manner. At its operated contacts 211, relay 210 closes an operating circuit for cutoff relay 220. At its operated contacts 413, relay 210 closes the ringing voltage, on the ringing generator conductor, through the upper winding of ring trip relay 440, through break contacts 443 on unoperated relay 440, and through operated make contacts 224 on cutoff relay 220 to the ring conductor R6. The ringing voltage passes through the ringer at station STA2 and is returned over tip conductor T6, through operated make contacts 222 on relay 220 to ground through break contacts 441 on unoperated relay 440.

When the call is answered at station STA2, the loop closed across conductors T6 and R6 serves to operate ring trip relay 440. Relay 440 locks operated from ground on operated make contacts 412 on relay 210 and through its preliminary make contacts 445. At contacts 441 and 443, relay 440 disconnects ringing from the line, and at its contacts 442 and 444, relay 440 closes an operating circuit for answer bridge relay 430 from the loop across conductors T6 and R6. Relay 430, in operating, reverses battery to the tip and ring conductors T5 and R5 and at its operated contacts 435, connects battery through resistance R41 to conductor HS5 to give trunk circuit 14 answer supervision.

Should the operator disconnect first, calling bridge relay 400 and release delay relay 210 release and ground is removed from the back sleeve conductor S5 to release the incoming first selector 15. It will be noted that the answer bridge relay 430 is held from the loop closed at station STA2 and at its operated contacts 231 and 437, holds the cutoff relay 220 and the ring trip relay 440 operated. When release delay relay 210 releases, an operating circuit is closed for the timing 3 relay 530 from ground through break contacts 214 on relay 210 and through operated contacts 225 on relay 220. After a short interval of time, relay 530 operates and at its contacts 534, reconnects ground to sleeve conductor S5 to mark the line circuit as busy in selector banks.

If the subscriber at station STA2 releases before the operator releases, answer bridge relay 430 is released and when relays 400 and 210 release, relays 220 and 440 release to restore the circuit to normal.

While there has been disclosed what is at present considered to be the preferred embodiment of the invention, other modifications will readily occur to those skilled in the art. It is not, therefore, desired that the invention be limited to the specific arrangement shown and described, and it is intended to cover in the appended claims all such modifications as fall within the true spirit and scope of the invention.

What is claimed is:

1. In a telephone system, a local office and a distant office, a line circuit in said local office, a line connected to said line circuit, a line switch associated with said line circuit, a group of trunk circuits in said local office for extending calls to said distant office, means responsive to the initiation of a call on said line for causing said line switch to establish a connection between said line circuit and an idle one of said trunk circuits, said connection including a control conductor, means in said distant office for returning on-hook and off-hook supervision to said trunk circuit at different times during the progress of the call, means in said trunk circuit for applying a first signal to said control conductor in response to the receipt of on-hook supervision, means in said trunk circuit for applying a second signal to said control conductor in response to the receipt of off-hook supervision, timing means in said line circuit operative to release the connection between said line circuit and said trunk circuit a predetermined time interval after the timing cycle of said timing means is initiated, and means in said line circuit for initiating the timing cycle of said timing means in response to the sequential application of said second and first signals to said control conductor.

2. In a telephone system, a local office and a distant office, a line circuit in said local office, a line connected to said line circuit, a line switch associated with said line circuit, a group of trunk circuits in said local office for extending calls to said distant office, means responsive to the initiation of a call on said line for causing said line switch to establish a connection between said line circuit and an idle one of said trunk circuits, said connection including a control conductor, means in said distant office for returning on-hook and off-hook supervision to said trunk circuit at different times during the progress of the call, means in said trunk circuit for applying a first signal to said control conductor in response to the receipt of on-hook supervision, means in said trunk circuit for applying a second signal to said control conductor in response to the receipt of off-hook supervision, timing means in said line circuit operative to release the connection between said line circuit and said trunk circuit a predetermined time interval after the timing cycle of said timing means is initiated, means in said line circut for initiating the timing cycle of said timing means in response to the sequential application of said second and first signals to said control conductor, and means responsive to the reapplication of said second signal to said control conductor before the completion of said timing cycle for arresting the operation of said timing means.

3. In a telephone system, a line, switching equipment, an operator's position, a group of trunk circuits for extending calls to said operator's position, means responsive to the initiation of a call on said line for causing said switching equipment to extend a connection from said line to an idle one of said trunk circuits, timing means interposed in the connection between said line and said trunk circuit, a control conductor extending between said timing means and said trunk circuit, said timing means being operative to release the connection between said line and said trunk circuit a predetermined time interval after the timing cycle of said timing means is initiated, means in said trunk circuit for applying on-hook and off-hook supervisory signals to said control conductor at different times during the progress of a call, and said timing means being arranged such that the timing cycle thereof is initiated only after the sequential application of off-hook and on-hook supervisory signals to said control conductor.

4. In a telephone system, a line, switching equipment, an operator's position, a group of trunk circuits for extending calls to said operator's position, means responsive to the initiation of a call on said line for causing said switching equipment to extend a connection from said line to an idle one of said trunk circuits, timing means interposed in the connection between said line and said trunk circuit, a control conductor extending between said timing means and said trunk circuit, said timing means being operative to release the connection between said line and said trunk circuit a predetermined time interval after the timing cycle of said timing means is initiated, means in said trunk circuit for applying on-hook and off-hook supervisory signals to said control conductor at different times during the progress of a call, said timing means being arranged such that the timing cycle thereof is initiated only after the sequential application of off-hook and on-hook supervisory signals to said control conductor, and means responsive to the reapplication of off-hook supervision to said control conductor before the completion of said timing cycle for arresting the operation of said timing means.

5. In a telephone system, a local office and a distant office, a group of trunk circuits in said local office for extending calls from said local office to said distant office, a first line, a line finder-selector link, means responsive to the initiation of a call on said first line for connecting said link to said first line, means then responsive to dial impulses appearing on said first line for causing said selector to seize an idle one of said trunk circuits to thereby extend a connection from said first line to said distant office, a second line, a line switch associated with said second line, and means responsive to the initiation of a call on said second line for causing said line switch to seize an idle one of said trunk circuits to thereby extend a connection from said second line to said distant office, timing means interposed in the connection between said second line and said trunk circuit, a control conductor extending between said timing means and said trunk circuit, said timing means being operative to release the connection between said second line and said trunk circuit a predetermined interval of time after the timing cycle of said timing means is initiated, means in said trunk circuit for applying on-hook and off-hook supervisory signals to said control conductor at different times during the progress of a call, and said timing means being arranged such that the timing cycle thereof is initiated only after the sequential application of off-hook and on-hook supervisory signals to said control conductor.

6. In a telephone system, a local office and a distant office, a group of trunk circuits in said local office for extending calls from said local office to said distant office, a first line, a line finder-selector link, means responsive to the initiation of a call on said first line for connecting said link to said first line, means then responsive to dial impulses appearing on said first line for causing said selector to seize an idle one of said trunk circuits to thereby extend a connection from said first line to said distant office, a second line, a line switch associated with said second line, and means responsive to the initiation of a call on said second line for causing said line switch to seize an idle one of said trunk circuits to thereby extend a connection from said second line to said distant office, timing means interposed in the connection between said second line and said trunk circuit, a control conductor extending between said timing means and said trunk circuit, said timing means being operative to release the connection between said second line and said trunk circuit a predetermined interval of time after the timing cycle of said timing means is initiated, means in said trunk circuit for applying on-hook and off-hook supervisory signals to said control conductor at different times during the progress of a call, said timing means being arranged such that the timing cycle thereof is initiated only after the sequential application of off-hook and on-hook supervisory signals to said control conductor, and means responsive to the reapplication of off-hook supervision to said control conductor before the completion of said timing cycle for arresting the operation of said timing means.

References Cited in the file of this patent

UNITED STATES PATENTS

| | | |
|---|---|---|
| 2,261,243 | Flint | Nov. 4, 1941 |
| 2,289,895 | Abbott | July 14, 1942 |
| 2,335,481 | Boswau | Nov. 30, 1942 |
| 2,494,475 | Hersey | Jan. 10, 1950 |